(12) United States Patent
Müller

(10) Patent No.: US 6,492,652 B2
(45) Date of Patent: Dec. 10, 2002

(54) OPTO-ELECTRONIC DISTANCE SENSOR AND METHOD FOR THE OPTO-ELECTRONIC DISTANCE MEASUREMENT

(75) Inventor: Daniel Müller, Stein am Rhein (CH)

(73) Assignee: Hera Rotterdam B.V., Rotterdam (NL)

( * ) Notice: Subject to any disclaimer, the term of this patent is extended or adjusted under 35 U.S.C. 154(b) by 40 days.

(21) Appl. No.: 09/742,806

(22) Filed: Dec. 20, 2000

(65) Prior Publication Data

US 2001/0019112 A1 Sep. 6, 2001

(30) Foreign Application Priority Data

Dec. 24, 1999 (CH) ............................................. 02377/99

(51) Int. Cl.$^7$ ................................................. G01C 3/08
(52) U.S. Cl. ............................. 250/559.38; 250/559.29; 250/559.4; 356/3.03; 356/3.06
(58) Field of Search ........................... 250/221, 559.29, 250/559.38, 559.4; 356/3.03, 3.06, 3.07

(56) References Cited

U.S. PATENT DOCUMENTS

| | | | | |
|---|---|---|---|---|
| 4,601,574 A | * | 7/1986 | Yamane et al. | 356/3.04 |
| 5,068,540 A | * | 11/1991 | Tsuji | 250/559.38 |
| 5,225,689 A | * | 7/1993 | Bückle et al. | 250/559.4 |
| 5,856,667 A | * | 1/1999 | Spirig et al. | 250/208.1 |
| 5,923,427 A | * | 7/1999 | Dong | 356/375 |
| 5,963,309 A | * | 10/1999 | Nakanishi et al. | 356/3.06 |
| 5,969,338 A | * | 10/1999 | Yoshitomi et al. | 250/221 |
| 5,986,255 A | * | 11/1999 | Guillot et al. | 250/214 R |
| 6,157,040 A | * | 12/2000 | Bauer | 250/559.38 |
| 6,353,478 B1 | * | 3/2002 | Rudd et al. | 356/631 |

* cited by examiner

Primary Examiner—Robert H. Kim
Assistant Examiner—Allen C. Ho
(74) Attorney, Agent, or Firm—Pearne & Gordon LLP

(57) ABSTRACT

The opto-electronic sensor (1) for the measurement of the distance (d) to an object (9), resp., for the identification of an object (9) within a monitoring zone (90) is based on triangulation measurement. A light source (21) emits light onto the object (9) or into the monitoring zone (90). The light (35) scattered by the object (9) impinges on a receiving element (31) at an angle ($\alpha$), which is dependent on distance (d) to the object (9). The latter has tappings (34.1–34.5) distributed over its length, in order to by means of a corresponding selection of these bring the measuring range of the sensor (1) to the value required by a control circuit (4) and as a result of this to increase the measuring resolution correspondingly. In variable amplifiers (6.1, 6.2), two or more detector signals ($I_1'$, $I_2'$) are multiplied with a variable factor respectively determined by the control circuit (4) and subsequently added, resp., subtracted in an adding—or subtracting stage (7). In an evaluation unit (8), the common signal for the generation of an object identification signal is processed further. The sensor (1) manifests a low measuring inaccuracy caused by noise and enables a continuous adjustability of the measuring distance (d).

11 Claims, 4 Drawing Sheets

OPTO-ELECTRONIC DISTANCE SENSOR AND METHOD FOR THE OPTO-ELECTRONIC DISTANCE MEASUREMENT

The invention presented here concerns an opto-electronic sensor for distance measurement and/or distance-dependent object identification and a method for the opto-electronic distance measurement and/or distance-dependent object identification, in accordance with the generic terms of the independent claims. The sensor and the method are based on triangulation measurement.

Sensors of this type on the one hand can be utilized for the measurement of the distance to an object, wherein the output signals represent continuous values or nevertheless a multitude of discrete values from an interval and represent a measure for the distance. On the other hand, sensors of this type are frequently only utilized for the determination, resp., identification of the presence of an object within a certain monitoring zone, wherein as output signals only two binary values "1" ("object present") or "0" ("no object present") are possible. When in this document "distance sensors" are mentioned, then understood by it are always sensors, which are suitable for the one and/or for the other application.

Figure 1:
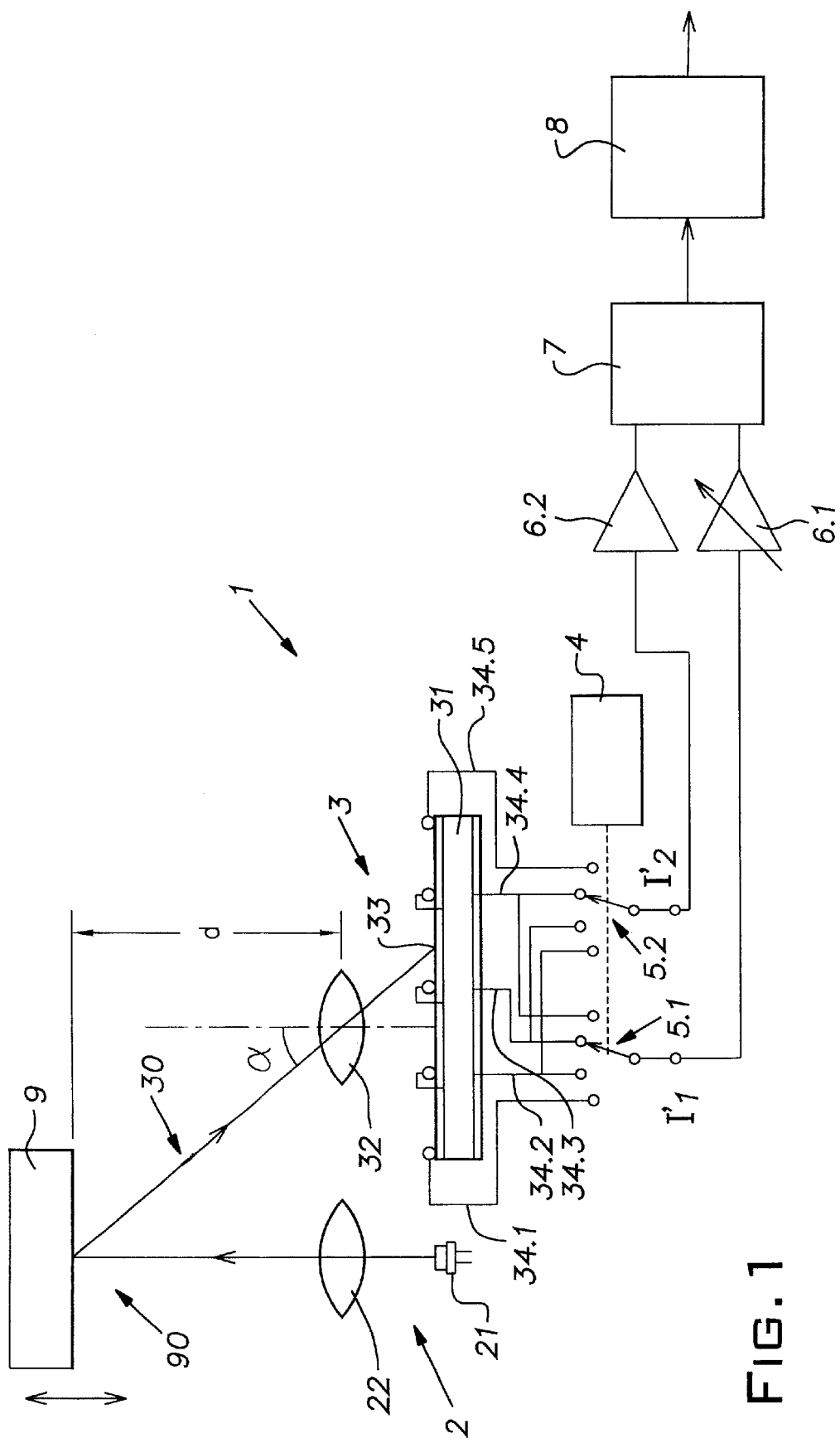
Figure 2:
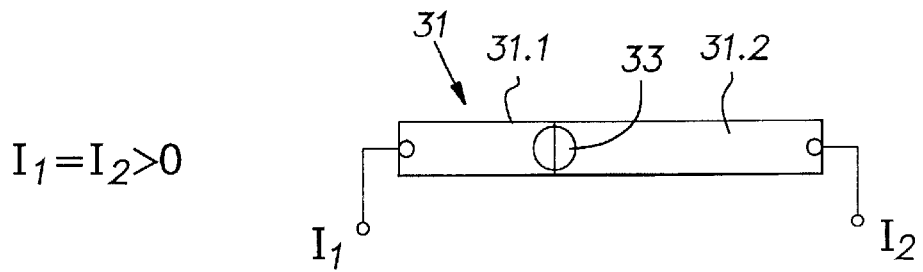
Figure 2:
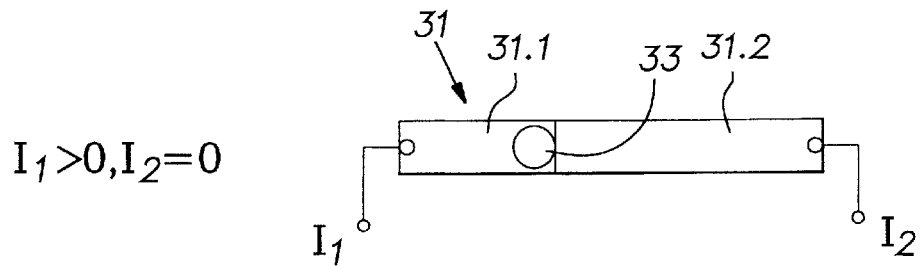
Figure 2:
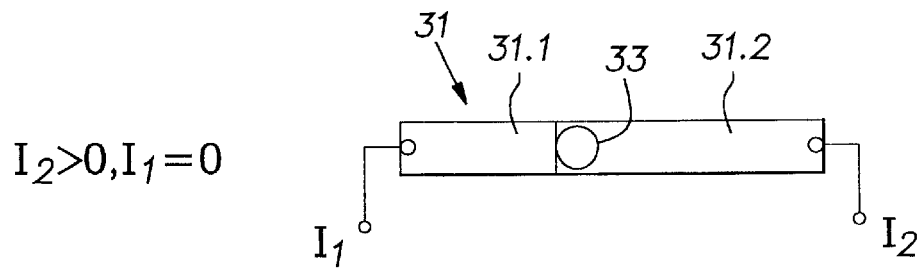
Figure 3:
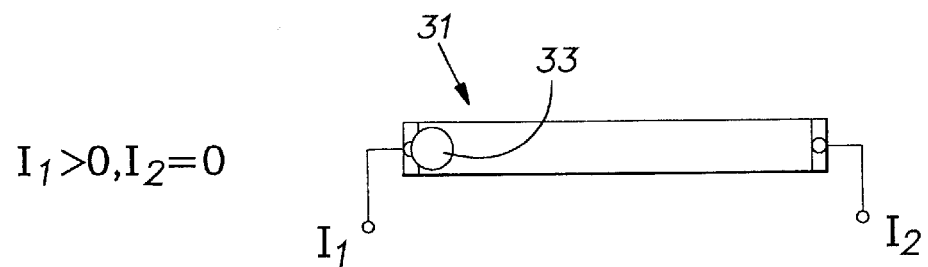
Figure 3:
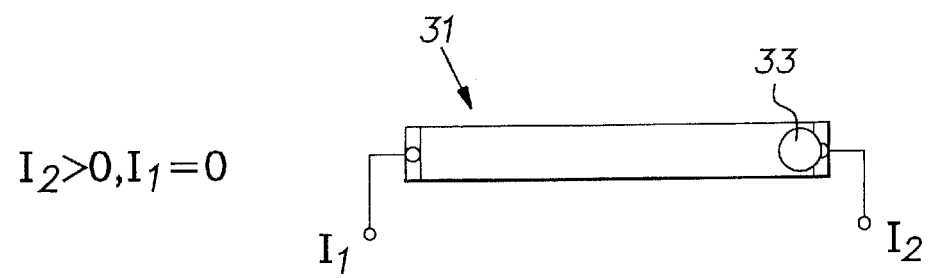
Figure 4:
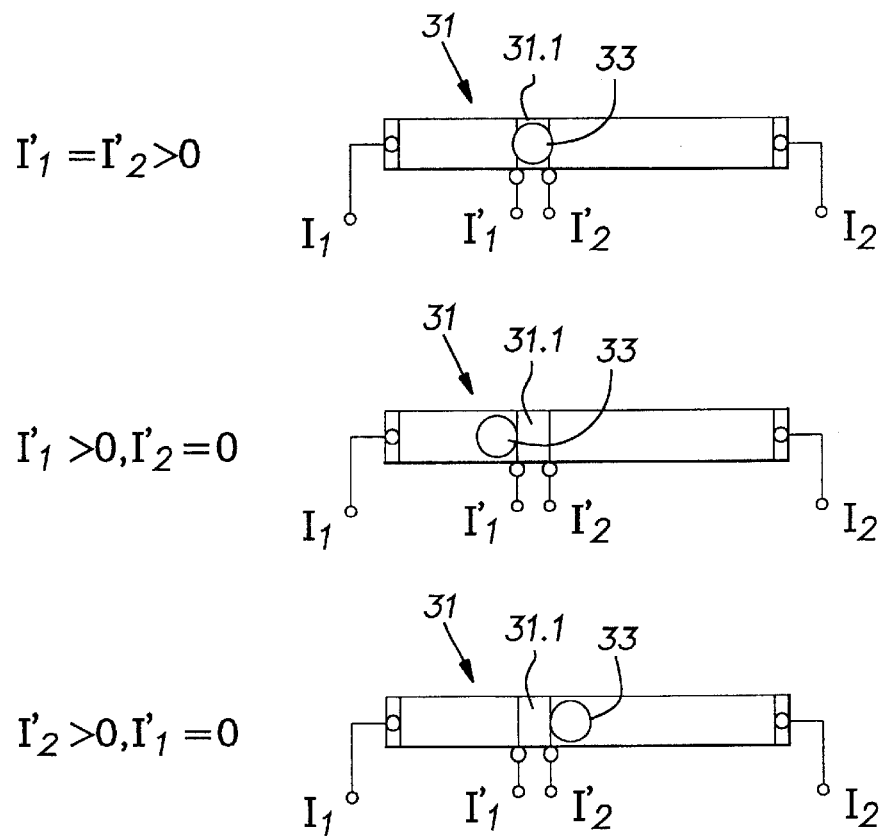
Figure 5:
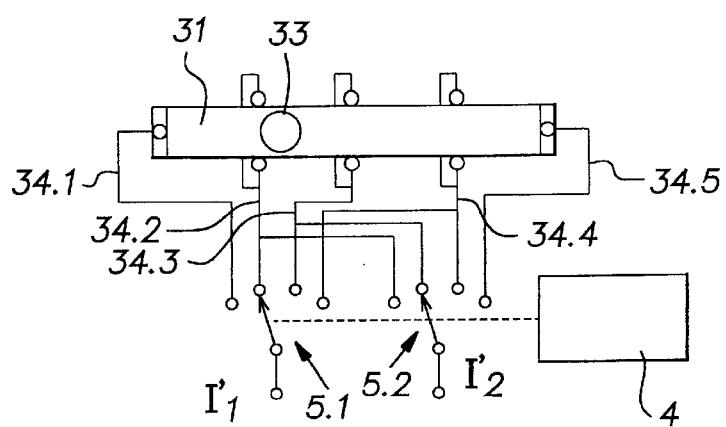

The prior art and the invention are explained in detail on the basis of Figures. These schematically illustrate:

FIG. 1 an embodiment of the distance sensor in accordance with the invention,

FIG. 2 signal conditions for a double receiver in accordance with prior art,

FIG. 3 signal conditions for a non-subdivided PSD in accordance with prior art,

FIG. 4 signal conditions for a subdivided PSD in accordance with prior art,

FIG. 5 a PSD variably subdividable by a control unit, and

Figure 6:
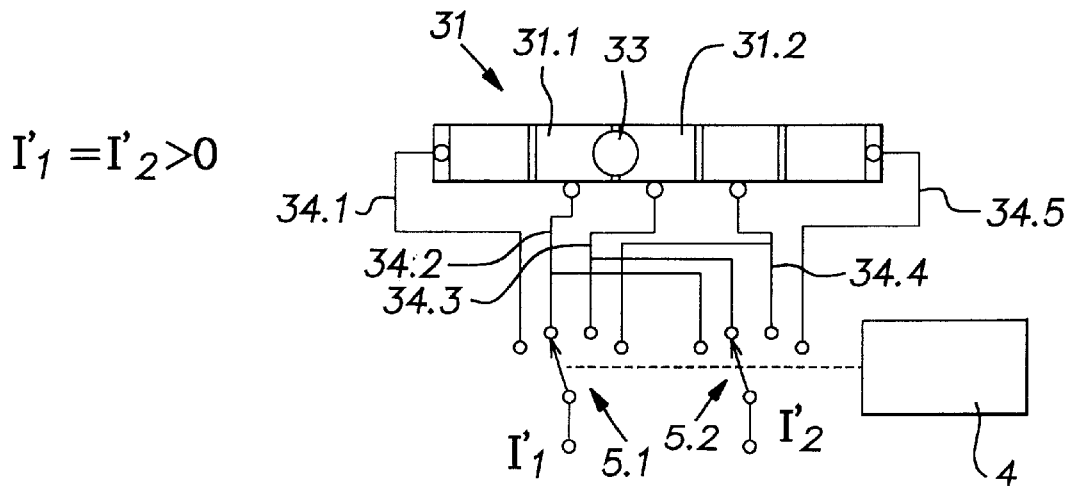
Figure 6:
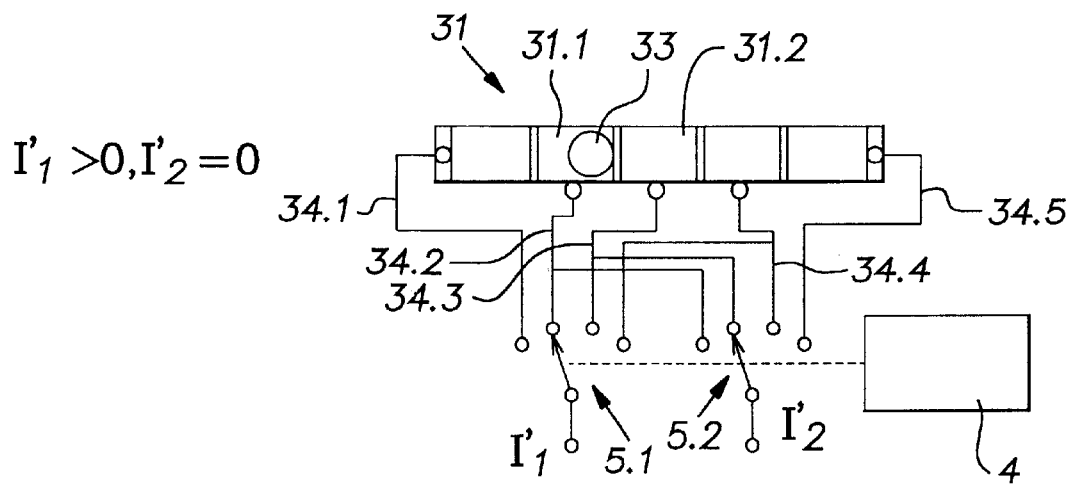
Figure 6:
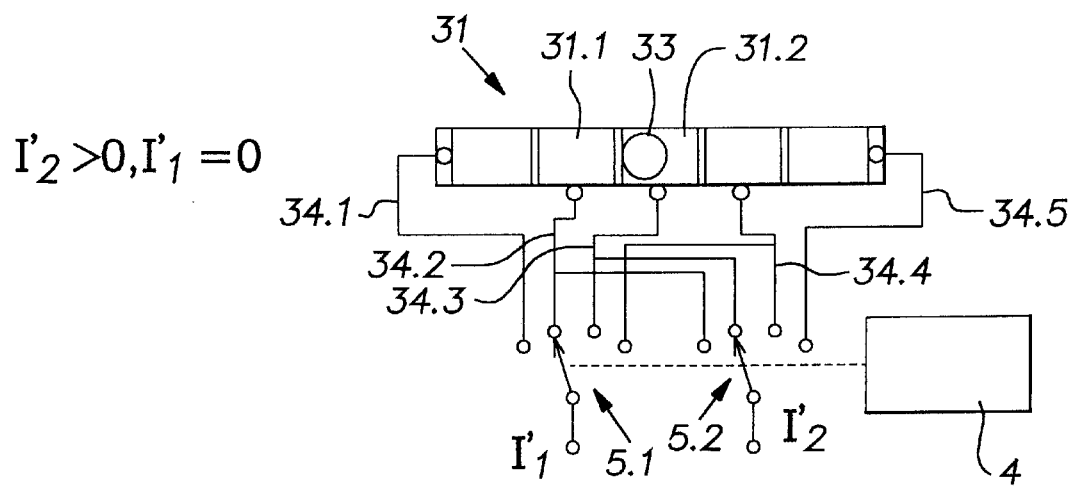

FIG. 6 a receiver array variably subdividable by a control circuit.

Known are opto-electronic distance sensors on the basis of triangulation, which operate with two neighbouring photo-detectors. An example for a light receiving element 31, which is composed of two photo-detectors 31.1, 31.2 and on which a received light spot 33 impinges, is schematically illustrated in FIG. 2 for three different situations. The switching distance here depends on the position of the transition of the two detectors 31.1, 31.2; as a rule, the distance setting is carried out by mechanical displacement of the two detectors 31.1, 31.2, resp., of a (not illustrated) detector lens arranged in series ahead.

The evaluation of the position information as a rule is carried out by comparing the two photo-currents $I_1$, $I_2$, either by means of subtraction or by means of division (also refer to DE-44 19 032). In the case of the subtraction, their result is subsequently compared with a threshold value. This is necessary, in order for the useful signal to achieve sufficient distance from the system-conditioned noise. The threshold value therefore has a value, which corresponds to a multiple of the noise level. If this threshold value is exceeded, then an object has been identified within the monitoring zone.

Also known, for example, from the patent document U.S. Pat. No. 4,601,574, are triangulation sensors, which operate with a position sensitive element (position sensitive device, PSD). A PSD light detector 31 of this type with a light spot 33 impinging on it, is schematically illustrated in FIG. 3 for two different situations. Here for the purpose of setting a desired switching point no mechanical adjustment of the receiving system takes place; the adjustment can be achieved by electronic means. To accomplish this, a process of division is utilized:

$$y=(I_1-I_2)/(I_1+I_2)$$

supplies the position y of the centre of gravity of the light spot 33 received from the two photo-electric currents $I_1$, $I_2$. From this, the distance to the object can be derived; by means of a comparison with corresponding threshold values, binary object identification signals can be set. In the case of this method, it is the state of the art, to teach the mentioned threshold values by means of the teach-in method and to store them within the sensor system in a non-volatile manner.

The main disadvantage of this method, viewed with respect to binary object identification signals, lies in the fact, that in comparison with the previous method with two neighbouring photo-detectors, the influence of the noise on the determined distance value is significantly greater and with this the measuring accuracy of the system significantly lower. This can easily be explained: In order to change from the situation $I_1$=100%, $I_2$=0% to the situation $I_1$=0%, $I_2$=100%, in the case of the PSD method (FIG. 3) the received light spot 33 has to travel from one end of the PSD 31 to the other, therefore it has to travel through the whole distance measuring range. In the case of the double receiver system (FIG. 2), to accomplish this only the length, resp., the diameter of the received light spot 33 is necessary: $I_1$=100%, $I_2$=0% is the case, when the light spot 33 is completely on one of the receivers 31.1. If the light spot 33 now moves to the other receiver 31.2, then $I_1$ reduces and $I_2$ increases; at $I_1$=0%, $I_2$=100%, the light spot 33 is completely on the other receiver 31.2. If one applies this to the measuring inaccuracy caused by the noise, then one can see, that the noise voltage, which in both cases is approximately the same, in the first case (FIG. 3) has to be relativized to the whole detector length, in the second case (FIG. 2), however, solely to the length of the received light spot.

For this reason, the expert for the determination of a binary object identification signal attempts to restrict the measuring range of the PSD 31 to the actually required measuring zone 31.1 and by means of this to massively reduce the measuring inaccuracy due to noise. In this manner, the distance range to be observed, which corresponds to a respective photo-electric current ratio of the PSD 31, is massively reduced, as is roughly illustrated in FIG. 4. As a result of this, a certain noise voltage only corresponds to a fraction of the inaccuracy with respect to distance; the noise-equivalent distance now refers to a significantly smaller measuring zone. The photo-electric currents of the measuring zone 31.1 in this document are designated as $I_1'$, $I_2'$, The selection of the measuring zone 31.1 customarily is made by means of a (not depicted) control circuit.

From the patent document U.S. Pat. No. 4,849,781 a method is known, which is schematically illustrated in FIG. 5. In it, a position-sensitive element 31 is equipped with tappings 34.1–34.5, which can be selected by a control circuit by means of electronic switches 5.1, 5.2. Thus it is possible to adjust the distance measuring range to be observed purely electronically.

A further disadvantage of the method known from the PSD in comparison with that using a double receiver is the significantly more expensive signal processing. While one can practically without any effort form the difference of two signals ahead of the signal amplifier and therefore subsequently only requires one amplifier channel, one can only with a relatively great effort and only with signals already amplified to sufficiently great signal values form the quotient. This therefore has the prerequisite, that two signal amplifiers have to be used.

It is the objective of the invention presented here to create an opto-electronic sensor and to indicate a method for the opto-electronic measurement of distances, which avoids the two main disadvantages described above. The objective is achieved by the sensor and by the method, as these are defined in the independent claims. The invention is based on a combination of two measures:

Reduction of the observed receiving zone to the approximate order of magnitude of the received light spot through the control circuit, in order to reduce the measuring inaccuracy due to noise.

Evaluation circuit with an addition—or subtraction stage, which in addition is extended by at least one variable amplifier stage. In this manner, the system can assure a continuous adjustability of the distance.

FIG. 1 schematically illustrates the structure of an embodiment of the distance sensor 1 in accordance with the invention. The sensor 1 contains a triangulation system with a transmitting unit 2 and a receiving unit 3. The transmitting unit 2 contains a transmitting light source 21, which, e.g., through a first lens 22 emits a transmission light bundle 20 into a monitoring zone 90. (Understood by light in this document is every electromagnetic radiation, in particular ultra-violet radiation (UV), visible light or infrared radiation (IR). In the case of an object 9 present in the monitoring zone 90, light is reflected at the object 9, resp., scattered and as received light travels through a second lens 32 to the receiving unit 3. The angle α between the received light bundle thrown back 30 and the receiving unit 3 is dependent on the distance d of the object 9 to the receiving unit 3; for this reason, the received light bundle 30 impinges on the receiving unit 3 as a received light spot 33 at a point dependent on the distance d. The receiving unit 3 contains a receiver element 31, which as a rule is a position-sensitive element (PSD); however, it can also be a photo-detector arrangement, in which several detectors are combined into zones corresponding to two or more required distance ranges.

The detector element 31 has tappings 34.1–34.5 distributed over its length, which correspond to distance measuring zones. The PSD 31 can be split-up into variable zones, for example, by a control circuit 4 through electronic switches 5.1, 5.2. These zones are selected by the control circuit in dependence of the required detection range. The latter is advantageously determined on the basis of the respective measuring situation by means of a teach-in beforehand.

The PSD 31 has the characteristic of indicating the position y of the received light spot 33 by mans of the distribution of two photo-electric currents $I_1'$, $I_2'$.:

When $I_1'=I_2'>0$, then the received light spot 33 is exactly in the centre of the observed zone (y=0).

When $I_1'>0$ and $I_2'=0$, then the received light spot 33 is completely in the zone 1 (y=+1), which, for example, in FIG. 4 is on the left of the current tapping of $I_1'$.

When $I_2'>0$ and $I_1'=0$, then the received light spot 33 is completely in the zone 2 (y=−1) (in FIG. 4 on the right of the current tapping of $I_2'$).

In between, the following is applicable: $y=(I_1'-I_2')/(I_1'+I_2')$; −1<y<+1.

With this, the position y of the received light spot 33 can be exactly determined, providing one is willing to amplify the photo-electric currents $I_1'$ and $I_2'$ separately and to make use of a dividing stage.

This in practice represents a considerable effort. For this reason, in the arrangement in accordance with the invention the subtraction process shall be applied, as it is known from sensors, which have several neighbouring photo detectors, for example, photo-diodes. For the purpose of subtraction, the sensor 1 in accordance with the invention contains a subtraction stage 7, followed by an evaluation unit 8. Since because of the dependence on diffuse reflection of the photo-electric currents, their difference amount cannot be equated with a distance, through direct subtraction of both photo-electric current solely the identification of the equality of the two photo-electric currents $I_1'$ and $I_2'$ can be carried out with assurance. This is the case, when the difference is equal to zero, resp., is in approximation very small. If this situation applies, then the received light spot 33 is located at the centre of the measuring zone.

Applicable for one PSD measuring zone is:

$$y=(I_1'-I_2')/(I_1'+I_2'); \quad -1<y<1.$$

True is y=0 for the case $I_1'=I_2'$; for all other cases, y≠0. The case y=0 is that case, which can be most easily identified by the evaluation circuit: It is detected, whether the measured signal y has dropped below a certain threshold value.

In order to be able to identify another position than that at the centre of the measuring zone, the equation is extended with a factor K as follows:

$$y'=(k \cdot I_1'-I_2')/(k \cdot I_1'+I_2'); \quad -1<y'<1; \; k>0.$$

Here y'=0, when $I_2'=k \cdot I_1'$. With this, the detectable position moves to factor k/(1+k) of the PSD length. Therefore the sensor 1 in accordance with the invention has variable first means of amplification 6.1 influenceable by the control circuit 4 as well as fixed or variable second means of amplification 6.2, which are installed in one or in both channels ahead of the subtraction stage 7. As a result of this, therefore the switching distance can be continuously varied within a measuring segment. The amplifiers 6.1, 6.2 can be implemented as voltage—and/or current amplifiers; in their place in this meaning therefore there can also be passive reducers and/or current-voltage transformers, which can be implemented as fixed, resp., variable. From a general point of view, these here are means 6.1, 6.2 for the variable weighting of the two photo-electric currents $I_1'$, $I_2'$, therefore for their interpolation, which in accordance with the invention takes place prior to their subtraction.

Advantageously the optical surface of the receiving element 31, the control circuit 4 of the tappings 34.1–34.5 as well as the variable amplifier arrangement 6.1, 6.2 are monolithically accommodated in an integrated circuit, for example, an ASIC.

FIG. 6 illustrates a part of an embodiment of the sensor 1 in accordance with the invention, in the case of which the receiving element 31 is implemented as a photo-detector array (for example, a diode array). In preference at least three and, for example, more than three zones—corresponding to photo-detectors—are present. The control circuit 4 by means of electronic switches 5.1, 5.2 selects the receiver pair 31.1, 31.2 corresponding to the required distance range, so that the photo-detector array 31 after the selection has been effected behaves like a double receiver (refer to FIG. 2).

What is claimed is:

1. Opto-electronic sensor for distance measurement of for the distance-dependent identification of objects or for both, distance measurement and the distance dependent identification of objects, comprising:

a transmission unit for the emission of light within a monitoring zone, the transmission unit comprising a light source;

a receiving unit with at least one photo detector for receiving light impinging from the monitoring zone, wherein the transmission unit and the receiving unit are arranged with respect to one another in such a manner, that the direction of propagation of light, which is emitted from said light source of the transmission unit to an object within the monitoring zone, and the direction of propagation of light, which is thrown back from the object to the receiving unit encompass an angle, which is dependent on the distance (d) of the object to the distance sensor;

a control and evaluation unit for the receiving unit, said control and evaluation unit comprising means for the sub-division of the photo-detector and the selection of at least two zones, from each of which an electric output signal ($I_1'$, $I_2'$) is receivable, the means for the sub-division comprising tappings and switches, wherein said at least two zones being such that the information, which zone said light emitted from said single light source and then thrown back from the object impinges on, is indicative of said angle being dependent on the distance of said object to the distance sensor; and means for the amplification of said output signals ($I_1'$, $I_2'$) in said control and evaluation unit, wherein the means for the amplification of the output signals ($I_1'$) of at least one zone have a variable amplification factor (k), said amplification factor being independent of the amplification factors of other ones of said at least two zones, such that said means for the amplification of the output signals serve as interpolation means.

2. Sensor in accordance with claim 1, wherein means for the formation of a sum or of a difference of amplified output signals of the at least two zones are connected in series behind the means for the amplification.

3. Sensor in accordance with claim 1, wherein the control and evaluation unit in addition has means for the comparison of the formed sum or difference with at least one variable threshold value.

4. Sensor in accordance with claim 1, wherein the control and evaluation unit in addition has means for storing the selection of at least one of the tappings, the amplification factor and of the variable threshold value.

5. Sensor in accordance with claim 1, wherein the photo-detector is a position-sensitive element (PSD).

6. Sensor in accordance with claim 1, wherein the photo-detector is a photo-detector array with at least 3 zones.

7. Method for the opto-electronic distance measurement and/or distance-dependent object identification, comprising the steps of:

emitting light into a monitoring zone, such that at least a part of the emitted light is thrown back from an object within the monitoring zone onto a receiving unit containing a photo-detector;

detecting, by a photo-detector at least a part of said thrown back light, wherein the direction of propagation of light, which propagates towards the object, and the direction of propagation of light, which is thrown onto the receiving unit, encompass an angle (a), which is dependent on the distance (d) of the object to the receiving unit;

sub-dividing the photo-detector and selecting, using switches, at least two zones, which correspond to differing distance ranges;

producing from each of said zones an electrical output signal ($I_1'$, $I_2'$);

amplifying said output signals, wherein the output signal of at least one of said at least two zones is amplified by a variable amplification factor, which is independent of the amplification factor of the other ones of said at least two zones; and interpolating the output signals ($I_1'$, $I_2'$) of said at least two zones.

8. Method in accordance with claim 7 wherein one of the sum and the difference of amplified output signals ($k \cdot I_1'$, $I_2'$) of the at least two zones is formed.

9. Method in accordance with claim 8 wherein one of the sum and the difference formed is compared with at least one variable threshold value.

10. Method in accordance with claim 7, wherein the subdivision of the photo-detector is implemented in dependence of a required measuring range.

11. Method in accordance with claim 7 wherein the selection of the zones, the amplification factor (k) and/or the variable threshold value are determined by means of teach-in and stored.

* * * * *